(12) United States Patent
Ward et al.

(10) Patent No.: US 8,495,739 B2
(45) Date of Patent: Jul. 23, 2013

(54) SYSTEM AND METHOD FOR ENSURING SCANNING OF FILES WITHOUT CACHING THE FILES TO NETWORK DEVICE

(75) Inventors: Matthew Ward, Atlanta, GA (US); Charles R. Arnett, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/755,835

(22) Filed: Apr. 7, 2010

(65) Prior Publication Data

US 2011/0252474 A1    Oct. 13, 2011

(51) Int. Cl.
*H04L 9/00* (2006.01)

(52) U.S. Cl.
USPC ............... 726/23; 726/24; 726/25; 726/26; 726/27; 713/187; 713/188; 713/189

(58) Field of Classification Search
USPC .......................................................... 726/23
See application file for complete search history.

(56) References Cited

U.S. PATENT DOCUMENTS

| | | | |
|---|---|---|---|
| 7,084,760 B2 | 8/2006 | Himberger et al. | |
| 7,359,962 B2 | 4/2008 | Willebeek-LeMair et al. | |
| 7,412,539 B2 | 8/2008 | Gmuender et al. | |
| 7,484,247 B2 | 1/2009 | Rozman et al. | |
| 7,546,371 B1 * | 6/2009 | Cheng et al. | 709/227 |
| 2009/0177765 A1 | 7/2009 | Stute et al. | |

OTHER PUBLICATIONS

Zhou et al.; "Modeling Network Intrusion Detection Alerts for Correlation", ACM Transactions on Information and System Security, vol. 10(1):4, Publication Date: Feb. 2007 (31-pages).
Hsu et al., "Scalable Network-based Buffer Overflow Attack Detection", ANCS'06, Dec. 3-5, 2006, San Jose, California USA, Copyright 2006 ACM 1-59593-580-0/06/0012 (9-pages).
Sonicwall Products UTM—Firewall—VPN—Wireless—Enforced Client Anti-Virus Anti-Spyware—SonicWALL, Inc; http://www.sonicwall.com/us/products/7534.html (2-pages).
Sonicwall Products UTM—Firewall—VPN—Wireless—Enterprise-Class Security Services—SonicWALL, Inc; http://www.sonicwall.com/us/products/315.html (2-pages).
Checkpoint Endpoint Policy Management Software Blade; http://www.checkpoint.com/products/softwareblades/endpoint-policy-management.html (5-pages).

* cited by examiner

*Primary Examiner* — Longbit Chai
(74) *Attorney, Agent, or Firm* — Christopher & Weisberg, P.A.

(57) ABSTRACT

A method and system for ensuring scanning of suspicious computer files without unnecessary caching of the files on a network device is provided. A network device receives a suspicious computer file and determines whether a target computer is protected by a malware protection program. If the network device determines that the target computer is protected by the malware protection program, the network device modifies the suspicious computer file to make the suspicious computer file unusable by the target computer and sends the modified suspicious computer file to the target computer.

24 Claims, 3 Drawing Sheets

SYSTEM AND METHOD FOR ENSURING SCANNING OF FILES WITHOUT CACHING THE FILES TO NETWORK DEVICE

CROSS-REFERENCE TO RELATED APPLICATION n/a

BACKGROUND

1. Field of the Invention

The present invention relates generally to computer security, and in particular, to a computer system and method for ensuring scanning of suspicious computer files sent to a target computer.

2. Description of the Related Art

The deployment and growth of large computer networks such as the Internet has facilitated the proliferation of malicious software programs known as malware. Malware programs are designed to infiltrate a target computer without the owner's permission in order to exploit the security weaknesses of the system and network. Malware is typically used to adversely impact performance or steal information stored in the target computers, such as account numbers, passwords, social security numbers, credit card numbers, etc.

Malware has become the preferred mode of operation for organized crime in the Internet, as malware can be spread with ease via email attachments, web downloads and file transfers. Malware carries code that damages host systems, creates backdoors to networks, allows attackers free entry into the network, redirects search engine results to paid advertisements, creates denial-of-service attacks and takes control of infected host systems.

One form of protection used to protect a target computer from malware encompasses scanning suspicious files at the network level, i.e., at a network device, such as a router, instead of at the target computer. This approach ensures that the suspicious files are scanned before the suspicious files are forwarded and executed at the target computer. Scanning suspicious files at the network level requires that the suspicious file be cached on the network device. The network device then scans the suspicious file and determines whether the suspicious file does not contain malware. If the suspicious file is not malware, the network device forwards the suspicious file to the target computer.

Scanning the suspicious file at the network device introduces significant latency and network throughput problems. For example, if the network device is simultaneously downloading and scanning suspicious files for a large number of users, the network device will likely experience a higher than normal processing delay. The performance of the network will be negatively affected, causing end users to experience long delays. Given the limited capability of network devices, many network devices limit the number of users that can download files simultaneously, resulting in a traffic bottleneck at the network device. The performance and capacity of the network becomes limited by the processing ability of the network device. Delays increase the response time of the network, which is especially undesirable for delay-sensitive and critical applications, such as time-sensitive protocols like HTTP and FTP.

The impact of network delay on applications can result in a significant increase in application response times and even possible application failure. Significant network delay can be caused by the simultaneous download of suspicious files. The traffic bottleneck at the network device causes network congestion, pushes the network bandwidth limits and ultimately results in end user dissatisfaction.

Moving the scanning to the target system is likewise problematic. A target computer, such as a target computer may or may not have a security program installed. If the target computer has a security program installed, the security program may or may not be up to date. Even if security software is installed in the target computer, a user of the target computer may decide to disable anti-virus and anti-spyware security software installed on the target computer. Similarly, the user of the target computer may decide to execute the suspicious file at the target computer without first scanning the suspicious file. If the suspicious file is malware, the target computer will become infected with malware, and will pose a threat to other systems connected to the network.

Therefore, what is needed is a computer system and method for ensuring scanning of files sent to the target computer.

BRIEF SUMMARY

A method and system for ensuring scanning of suspicious computer files without catching files to a network device is described. In accordance with one aspect, a network device receives a suspicious computer file and determines whether a target computer is protected by a malware protection program. If the network device determines that the target computer is protected by the malware protection program, the network device modifies the suspicious computer file to make the suspicious computer file unusable by the target computer and sends the modified suspicious computer file to the target computer.

In accordance with another aspect, a system for ensuring scanning of suspicious computer files is described. The system has a network device with a central processing unit (CPU), a computer readable memory, the computer readable memory in communication with the CPU, a computer readable storage media in communication with the CPU, and program instructions. The computer system has first program instructions to receive a suspicious computer file at a network device. The computer system has second program instructions to determine at the network device whether a target computer is protected by a malware protection program, and if so, instruct the network device to modify the suspicious computer file to make the suspicious computer file unusable by the target computer and send the modified suspicious computer file to the target computer. The first and second program instructions are stored on the computer readable storage media for execution by the CPU via the computer readable memory.

In accordance with yet another aspect, a computer program product for ensuring scanning of a suspicious computer file sent to a target computer is described. The computer program product has a computer readable storage medium and program instructions. The computer program product has first program instructions to receive the suspicious computer file at a network device. The computer program product has second program instructions to instruct the network device to determine whether the target computer is protected by a malware protection program, and if so, instruct the network device to modify the suspicious computer file to make the suspicious computer file unusable by the target computer and send the modified suspicious computer file to the target computer. The first and second program instructions are stored on the computer readable storage medium.

BRIEF DESCRIPTION OF THE SEVERAL VIEWS OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside in hardware and/or software to implement a system and method for ensuring scanning of files sent to a target computer. Accordingly, the hardware and/or software components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
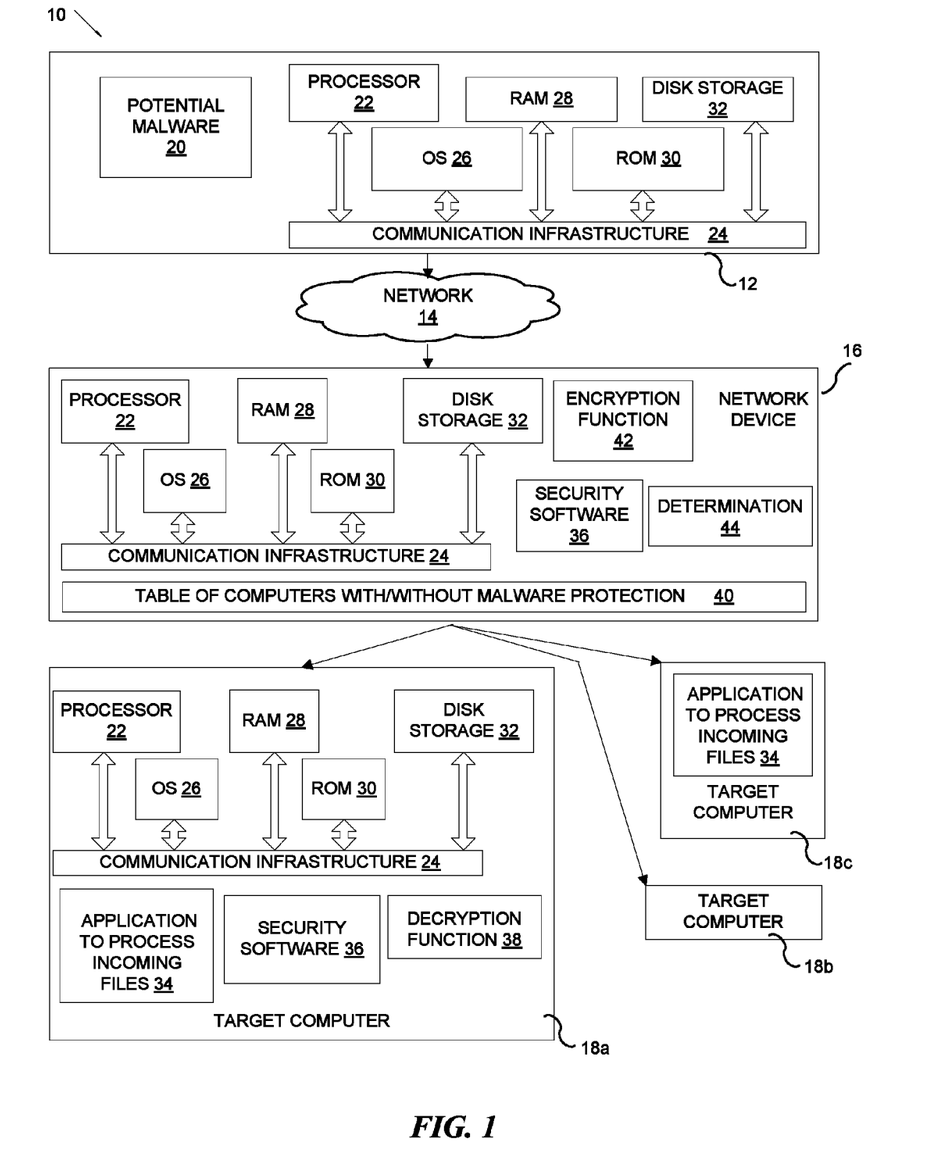
FIG. 1 is a block diagram of a system constructed in accordance with the principles of the present invention.

The present invention provides a computer system and method for ensuring scanning of suspicious computer files sent to a target computer. Referring now to the drawing figures in which like reference designators refer to like elements, there is shown in FIG. 1 a diagram of a system constructed in accordance with the principles of the present invention and referred to generally as '10'. System 10 includes one or more malware transmitting systems 12 connected to network 14. System 10 further includes one or more network devices 16 connected to network 14. Network device 16 is connected to target computers 18a, 18b and 18c, collectively referred to herein as target computer 18. Although FIG. 1 shows target computers 18 connected directly to network device 16, it is understood that such connection need not be direct. It is contemplated that target computers 18 can communicate with network device 16 wirelessly or via a wired connection using an intranet or other communication network.

As is shown in FIG. 1, malware transmitting device 12 communicates with target computer 18 via network device 16 connected to network 14. In one embodiment, malware transmitting system 12 sends potential malware 20 to target computer 18 via network 14. Target computer 18 may be any computing device, for example, laptop, computer terminal, server, PDA, mobile device, etc. Target computer 18 may be located in a remote location from malware transmitting system 12, may have a different domain than malware transmitting device 12 or may be part of a same network as malware transmitting system 12. In one embodiment, target computer 18 includes processor 22 in communication with communication infrastructure 24. Processor 22 runs operating system 26 on target computer 18. Communication infrastructure 24 further communicates with random access memory 28, read only memory 30 and secondary memory, e.g., disk storage, 32. Elements 22-32 are described in more detail below with reference to FIG. 2. Target computer 18 includes application 34 to processes incoming files received from network device 16. In accordance with one aspect, some target computers 18 are protected with security software 36, and some target computers are not protected with security software 36. For example, in one embodiment, target computers 18a and 18b have security software 36 installed that scans incoming files for malware. In addition, target computers 18a and 18b include application 34 to process incoming files. Target computers 18a and 18b further include decryption function 38. Network device 16 encrypts files sent to target computers 18a and 18b. Target computers 18a and 18b use decryption function 38 to decrypt the encrypted incoming files.

In another embodiment, a target computer 18 such as target computer 18c includes application 34 but does not include security software 36. In this embodiment, network device 16 scans files before sending the files to target computer 18c to ensure that the files do not contain potential malware 20.

Network device 16 may be a device that handles message transfers between computers connected to network 14. Network device 16 may be a network appliance such as a router having software and hardware configured to route information between computer networks and may be connected two or more logical networks. Network device 16 may connect to network 14 in a wired manner such as though copper or fiber optic cables, or wirelessly such as by radio frequency signals and may be a switch, a network hub or a switching hub. Network device 16 may be a stand-alone device, a gateway, or may be implemented using software running on a server.

Network device 16 includes processor 22 in communication with communication infrastructure 24. Processor 22 runs operating system 26 on network device 16. Communication infrastructure 24 further communicates with random access memory 28, read only memory 30 and disk storage 32. Network device 16 further includes table of computers with and without security software 36. Network device 16 uses table 40 to determine which target computers have security software 36 installed and which target computers do not have security software 36 installed. In one example, table 40 lists target computers 18a and 18b as protected systems and target computer 18c as an unprotected system.

Before sending a file to target computer 18, network device 16 determines whether target computer 18 is protected by security software 36 using determination function module 44. Determination function module 44 determines whether target computer 18 has security software 36 to scan incoming files. If target computer 18 is protected by security software 36, network device 16 encrypts the file using encryption function 42 before sending the file to target computer 18. Encryption function 42 makes the file unusable until the file is scanned by security software 36. If network device determines that target computer 18 is not protected by security software 36, network device 16 scans the file with security software 36 to ensure the file does not contain potential malware 20 before sending the file to target computer 18.

Network device 16 may include a configuration table having a collection of information, including information on computer addresses, such as an address of target computer 18. The configuration table may include information such as routing priorities for different connections, rules for handling both routine and special cases of traffic, connections that lead to particular groups of computer addresses, distance and cost algorithms to determine a best route for a given packet, etc. In addition, network device 16 may perform translations of various protocols between different networks. Network device 16 may follow and enforce rules concerning security for target computer 18 and may be configured to implement security measures. Network device 16 may act as a hardware firewall and may act to filter packets sent to target computer 18 to prevent unauthorized access to target computer 18.

Network device 16 protects target computer 18 from malware that could compromise the confidentiality of information in target computer 18. Network device 16 may use a set of predefined or user-created rules to determine whether a packet is to be forwarded to target computer 18 or dropped. Network device 16 may examine a header of a packet and additional characteristics such as a packet's actual origin in determining whether to forward a packet to target computer 18. Network device 16 may also determine whether a packet originated from a wide area network or from a local network, or whether incoming traffic is a response to existing outgoing connections, such as a request for a web page. Network device 16 may also filter packets based on their source/destination addresses, port numbers, packet attribute and packet state. Network device 16 may filter specific types of network traffic using not only address filtering but also protocol filtering. As such, the decision to forward or reject traffic may be dependent upon the protocol used, for example, HTTP, ftp or telnet protocol. In addition, network device 16 may compare a packet to a set of criteria before forwarding the packet. Depending on the packet and the criteria, network device 16 may decide to drop the packet, forward the packet to target computer 18 or send a message to the packet originator.

In accordance to one aspect, network device 16 may work with or be part of an application level gateway or a proxy that filters packets at the application layer. Network device 16 may ensure that the incoming or outgoing packets do not access services for which there is no established proxy. For example, an application level gateway that is configured to be a web proxy may not allow any ftp, gopher, telnet or other traffic through. The application level gateway may also be configured to filter application specific commands such as http:post and get, etc.

Network device 16 may be an edge router that is placed at the edge of network 14 and may communicate using an external Border Gateway Protocol ("BGP"), may be a subscriber edge router located at the edge of a subscriber's network or may be an inter-provider border router that interconnects networks by maintaining BGP sessions.

In one scenario, network device 16 may be a core router that resides within the middle or backbone of network 14. Network device can also be located at the periphery of network 14. Network device 16 may connect to network 14 via different connections wired and/or wireless connections, and may be configured to use different connections for uploading or downloading packets. For example, one connection may be a T-1 connection and another connection may be an Integrated Services Digital Network ("ISDN") line. The configuration table in network device 16 may be configured to instruct network device 16 to use the T-1 line for out-bound packets unless the T-1 line is unavailable. Network 14 may be the Internet or an intranet network, or may be a network using any suitable protocol such as TCP/IP, Ethernet, etc.

Malware transmitting system 12 may be any computing device, for example, laptop, computer terminal, server, PDA, mobile device, etc. Malware transmitting system 12 may be located in a remote location from target computer 18, may have a different domain than target computer 18 or may be part of a same network as target computer 18.

Malware transmitting system 12 sends a suspicious computer file to target computer 18 via network device 16. Malware transmitting system 12 sends the suspicious computer file via an email attachment, a file download, a web browser, etc. Malware transmitting system 12 also makes the suspicious computer file available to other systems connected to target computer 18 for download. The suspicious computer file may be categorized as malware, adware, spyware, virus, worm, trojan, rootkit, crimeware, and other malicious type of software.

In one embodiment, the suspicious computer file is potential malware 20. Potential malware 20 may be a program that copies itself and, but for the present invention, would infect target computer 18. Potential malware 20 can also be a program that contains polymorphic code that mutates with every execution, or a program that contains metamorphic code and rewrites itself completely each time it is executed. If executed at target computer 18, potential malware 20 would destroy data in target computer 18, affect the functional performance of target computer 18, transfer control of target computer 18 to a third party, access information on target computer 18, etc.

In accordance with one aspect, target computer 18 may have security software 36 like a malware protection program, a participating agent, etc. installed. The participating agent may be a desktop or server agent configured to scan suspicious computer files to determine whether the suspicious computer files are safe programs or malware. The participating agent may define policies that restrict or allow suspicious computer files based on their categorization. The participating agent may include definitions for content categories and may have a content filtering policy that restricts certain suspicious computer files or looks for specific patterns in suspicious computer files. The participating agent may block specific patterns using regular expression syntax and may restrict downloading of suspicious computer files based on the transmission format. For example, the participating agent may block suspicious computer files transmitted via ("Simple Mail Transfer Protocol") SMTP in Multipurpose Internet Mail Extensions ("MIME") types, given that most automated email is transmitted in this format. The participating agent may also block downloads of executables, such as MIME type application/octet-streams.

The participating agent may also set policies governing usage of public instant messaging ("IM") clients given that public IM clients provide means for unmonitored communications and exhibit security vulnerabilities that are often the target of malware. The participating agent may utilize antivirus and anti-spyware algorithms to protect target computer 18. The participating agent may be a desktop or server agent that has encryption credentials to decrypt and scan a suspicious computer file for malware. The participating agent may be configured to analyze and verify that a suspicious computer file is not malware. The participating agent can release the suspicious computer file to a user once the participating agent determines that the suspicious computer file is not malware.

In accordance with one aspect, network device 16 may be configured to modify some suspicious computer files and to cache and scan other suspicious computer files before forwarding the suspicious computer files to target computer 18. Network device 16 may determine whether target computer 18 has host-based security software 36 running, i.e. has a participating agent installed and running Network device 16 may forward a modified suspicious computer file to target computer 18 when target computer 18 is protected by a participating agent. In this way, network device 16 does not have to cache and scan the suspicious computer file before forwarding it to target computer 18.

Caching and scanning suspicious computer files at network device 16 may introduce significant latency and network throughput problems, especially if many users are downloading files that need to be scanned at network device 16. For example, malware transmitting system 12 may send a suspicious computer file, such as potential malware 20, to target computer 18. Malware transmitting system 12 may send potential malware 20 to network device 16 via network 14. Network device 16 may receive potential malware 20 and may determine that target computer 18 is the destination system. Network device 16 may determine, using table 40, whether target computer 18 has a participating agent running on target computer 18. The participating agent is a malware detection/protection software that scans files for malware. Upon receipt of a file, security software 36 in network device 16 determines that the file is suspicious. If security software 36 determines that the file is suspicious, determination function module determines if target computer has its own malware detection security software 36. If target computer has its own malware detection security software 36, encryption function 42 in network device 16 encrypts the suspicious computer file (or otherwise modifies the suspicious computer file to de-activate any malicious function within the suspicious computer file) and network device 16 forwards the encrypted (or otherwise modified) suspicious computer file to target computer 18. Network device 16 ensure that the suspicious computer file is scanned at target computer 18 by using encryption function 42 to modify a part of the suspicious computer file, i.e. modify a part of potential malware 20 to make the suspicious computer file unexecutable. Network device 16 may modify parts of the suspicious computer file as the suspicious computer file passes through network device 16. By modifying the suspicious computer file, network device 16 ensures that the suspicious computer file is scanned at target computer 18 without introducing significant latency in the network file transfer process.

Modifying the suspicious computer file may make the suspicious computer file unusable until a participating agent scans the suspicious computer file. The suspicious computer file may be encrypted to render the suspicious computer file unusable up to the time that the suspicious computer file undergoes antivirus or malware scanning Network device 16 may encrypt the complete suspicious computer file or may encrypt parts of the suspicious computer file, such as entry points or sections of the suspicious computer file that may render the suspicious computer file unexecutable. After network device 16 modifies the suspicious computer file, network device 16 may send the suspicious computer file to target computer 18. In this embodiment, target computer 18 is protected by a participating agent and is configured to receive the suspicious computer file. The participating agent scans the suspicious computer file before the suspicious computer file can be used by target computer 18. The participating agent may determine whether the suspicious computer file is malware. If the suspicious computer file is not malware, the participating agent may de-crypt the file in order to make the file usable.

If the participating agent determines that the suspicious computer file is malware, the participating agent may alert a user or a system administrator of the presence of the malicious program by performing a malware action. Some examples of malware actions may include alerts such as flashing a warning message on a screen, emailing the system administrator, updating a system log with an entry describing the malware, sounding an alarm, running a malware removal program, identifying a classifier of malware behavior to ease future identification of malware, performing a functional and content related analysis of the malware, updating a database containing previously identified malware, storing a malware identifier in a local or remote database, extracting a malware signature and subsequently providing access to the extracted signature to easily recognize the malware in the future, etc.

Network device 16 may coordinate with target computer 18 to determine whether or not to scan the suspicious computer file or to encrypt the suspicious computer file for scanning with a participating agent. For example, there may be fifty target computers 18, with forty nine of the fifty target computers 18 having a participating agent, such as Proventia Desktop, installed and running Suspicious computer files requested by the forty nine target computers may be encrypted by network device 16 to be later scanned by the participating agent, in this case, by Proventia Desktop. The participating agent may receive a suspicious computer file and may automatically decrypt the suspicious computer file as part of the participating agent's normal scanning process. On the other hand, suspicious computer files requested by the fiftieth ($50^{th}$) target computer, i.e. a system that does not have a participating agent installed, may be cached and scanned at network device 16 using security software 36. Network device 16 may be configured to cache and scan files that are destined to unprotected systems.

In accordance with another aspect, target computer 18 may not have a participating agent installed or may have a participating agent installed but the participating agent may not be running on target computer 18. Network device 16 may determine this status and may cache and scan a suspicious computer file before forwarding the suspicious computer file to unprotected target computer 18. For example, malware transmitting system 12 may send a suspicious computer file such as potential malware 20 to target computer 18. Potential malware 20 may travel through network 14 and then through network device 16. Network device 16 may determine whether target computer 18 has a participating agent installed and running Network device 16 may make this determination when the suspicious computer file arrives at network device 16 or prior, such as start up of target computer 18 or start up of network device 16. Network device 16 may also make this determination by periodically polling target computer 18. If target computer 18 does not have a participating agent installed and running, network device 16 may cache and scan the suspicious computer file before forwarding the suspicious computer file to target computer 18. In this way, network device 16 ensures that the suspicious computer file is scanned before forwarding the suspicious computer file to target computer 18.

In accordance with yet another aspect, target computer 18 may or may not have a participating agent installed. Target computer 18 may have a participating agent installed but the participating agent may not be running on target computer 18. Irrespective of whether target computer 18 has a participating agent installed, network device 16 may forward a modified suspicious computer file to target computer 18. Target computer 18 may be configured to, upon receipt, submit the suspicious computer file for further scanning to a network-based security device. Network device 16 may instruct target computer 18 to submit the suspicious computer file for further scanning to a network-based security device. For example, malware transmitting system 12 may send a suspicious computer file, such as potential malware 20, to target computer 18. Potential malware 20 may travel through network 14 and then through network device 16. Network device 16 may or may not determine whether the destination system, i.e. target computer 18, has a participating agent installed and therefore modifies and forwards the suspicious computer file to target computer 18. As explained above, modification of the file can be performed by modifying parts of the file, modifying the complete file, etc.

Target computer 18 may submit the file for scanning to a network-based security device. Alternatively, network device 16 may provide a web page on network device 16 where target computer 18 may submit the suspicious computer file for scanning For example, a suspicious computer file attached to an email may require a password to unlock the suspicious computer file. The suspicious computer file and the password may be submitted to the web page so that the suspicious computer file may be scanned to verify that the suspicious computer file is free of malware. This approach may be used by users of target computer 18 who do not want to run desktop participating agents.

If target computer 18 does not have a participating agent installed, target computer 18 may be required to install the participating agent before using the suspicious computer file. The participating agent may be made available on network 14 or may be sent automatically by network device 16 to target computer 18. The proliferation of participating agents may be encouraged by preventing target computer 18 from using the suspicious computer file unless target computer 18 agrees to install the participating agent.

In accordance with yet another aspect, network device 16 ensures scanning of suspicious computer files by performing real-time scanning of the suspicious computer file as the suspicious computer file passes through network device 16. If the suspicious computer file contains malware, network device 16 may end the transfer of the rest of the suspicious computer file and may provide an encrypted marker to inform a participating agent that the suspicious computer file is malicious. Target computer 18 may not need to wait for the complete file to be scanned and may not be able to execute the suspicious computer file and will.

Network device 16 may ensure better system security while making it possible to achieve firewall-like speeds in network device 16. For example, network device 16 may be a Unified Threat Management ("UTM") device. By encrypting all or a portion of a suspicious computer file as it passes through network device 16, the throughput of network device 16 may be very high given that the work of scanning a suspicious computer file is done at an economical place, i.e. target computer 18, whenever possible. Network device 16 may utilize IBM Internet Security System's Protocol Analysis Module ("PAM") to detect that a suspicious computer file is being downloaded to encrypt the suspicious computer file as the suspicious computer file passes through the device to render the suspicious computer file unusable until a participating host-based agent decrypts the suspicious computer file. Communications between software in target computer 18 and network device 16 may inform network device 16 the files that network device 16 needs to scan and the files that network device 16 may encrypt. This approach prevents network traffic from experiencing a bottleneck at network device 16 without compromising security scanning of incoming suspicious computer files. Network device 16 may offload the task of security scanning to target computer 18, wherever possible, allowing network device 16 to handle more overall users.

Of note, although FIG. 1 shows malware transmitting device 12, network device 16 and target computers 18 as each containing identically numbered processor 22, communication infrastructure 24, operating system 26, RAM 28, ROM 20 and disk storage 32, such designations are provided solely for ease of understanding and diagrammatic simplicity. It is understood that the type, size, capacity, etc. of these elements may differ among malware transmitting device 12, network device 16 and target computers 18 based on the computing and storage capacity requirements.

Figure 2:
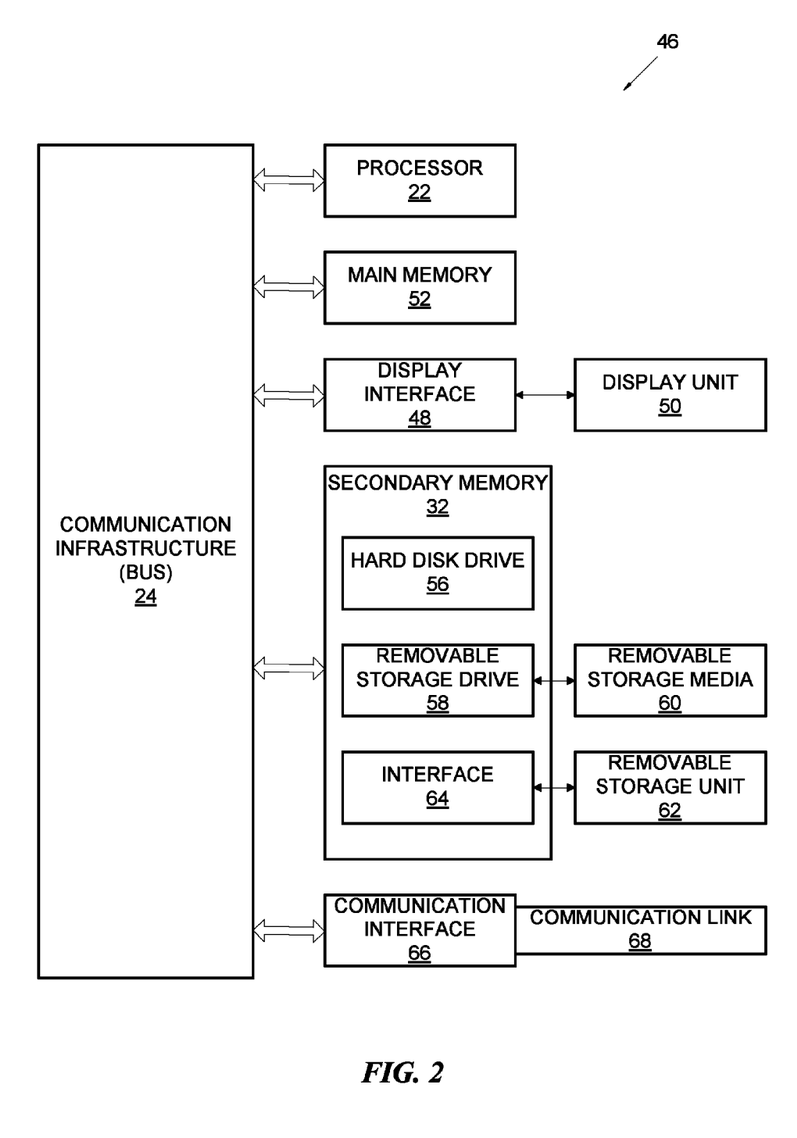
FIG. 2 is a block diagram of an exemplary network device, target computing device and malware transmitting device in accordance with the principles of the present invention.

FIG. 2 is a block diagram of an exemplary network device, target computer and malware transmitting device in accordance with the principles of the present invention and referred to generally as "46." System 46 may be an exemplary target computer 18 (FIG. 1), network device 16 (FIG. 1) or malware transmitting system 12 (FIG. 1) described in further detail. System 46 includes one or more processors, such as processor 22 programmed to perform the functions described herein. The processor 22 is connected to a communication infrastructure 24, e.g., a communications bus, cross-bar interconnect, network, etc. Network device 16 may use computer programs stored on disk storage for execution by a central processing unit ("CPU") via RAM in network device 16. Various software embodiments are described in terms of this exemplary computer system. After reading this description, it will become apparent to a person of ordinary skill in the relevant art(s) how to implement the invention using other computer systems and/or computer architectures. It is also understood that the capacities and quantities of the components of the architecture described below may vary depending on the device, the quantity of devices to be supported, as well as the intended interaction with the device. For example, access to target computer 18 for configuration and management may be designed to occur remotely by web browser. In such case, the inclusion of a display interface and display unit may not be required.

The system 46 may optionally include or share a display interface 48 that forwards graphics, text, and other data from the communication infrastructure 24 (or from a frame buffer not shown) for display on the display unit 50. The computer system also includes a main memory 52, such as random access memory ("RAM") 28 and read only memory ("ROM") 30, and may also include a secondary memory 32. The secondary memory 54 may include, for example, a hard disk drive 56 and/or a removable storage drive 58, representing a floppy disk drive, a magnetic tape drive, an optical disk drive, etc. The removable storage drive 58 reads from and/or writes to a removable storage media 60 in a manner well known to those having ordinary skill in the art. Removable storage media 60, represents, for example, a floppy disk, magnetic tape, optical disk, etc. which is read by and written to by removable storage drive 58. As will be appreciated, the removable storage media 60 includes a computer usable storage medium having stored therein computer software and/or data.

In alternative embodiments, the secondary memory 54 may include other similar means for allowing computer programs or other instructions to be loaded into the computer system and for storing data. Such means may include, for example, a removable storage unit 62 and an interface 64. Examples of such may include a program cartridge and cartridge interface (such as that found in video game devices), flash memory, a removable memory chip (such as an EPROM, EEPROM or PROM) and associated socket, and other removable storage units 62 and interfaces 64 which allow software and data to be transferred from the removable storage unit 62 to other devices.

The system 46 may also include a communications interface 66. Communications interface 66 allows software and data to be transferred to external devices. Examples of communications interface 66 may include a modem, a network interface (such as an Ethernet card), a communications port, a PCMCIA slot and card, wireless transceiver/antenna, etc. Software and data transferred via communications interface/module 66 may be, for example, electronic, electromagnetic, optical, or other signals capable of being received by communications interface 66. These signals are provided to communications interface 66 via the communications link (i.e., channel) 68. This channel 68 carries signals and may be implemented using wire or cable, fiber optics, a phone line, a cellular phone link, an RF link, and/or other communications channels.

Of course, system 46 may have more than one set of communication interface 66 and communication link 68. For example, system 46 may have a communication interface 66/communication link 68 pair to establish a communication zone for wireless communication, a second communication interface 66/communication link 68 pair for low speed, e.g., WLAN, wireless communication, another communication interface 66/communication link 68 pair for communication with low speed wireless networks, and still another communication interface 66/communication link 68 pair for other communication.

Computer programs (also called computer control logic) are stored in main memory 52 and/or secondary memory 54. For example, computer programs are stored on disk storage, i.e. secondary memory 54, for execution by processor 22 via RAM, i.e. main memory 52. Computer programs may also be received via communications interface 66. Such computer programs, when executed, enable the method and system to perform the features of the present invention as discussed herein. In particular, the computer programs, when executed, enable the processor 22 to perform the features of the corresponding method and system. Accordingly, such computer programs represent controllers of the corresponding device.

Figure 3:
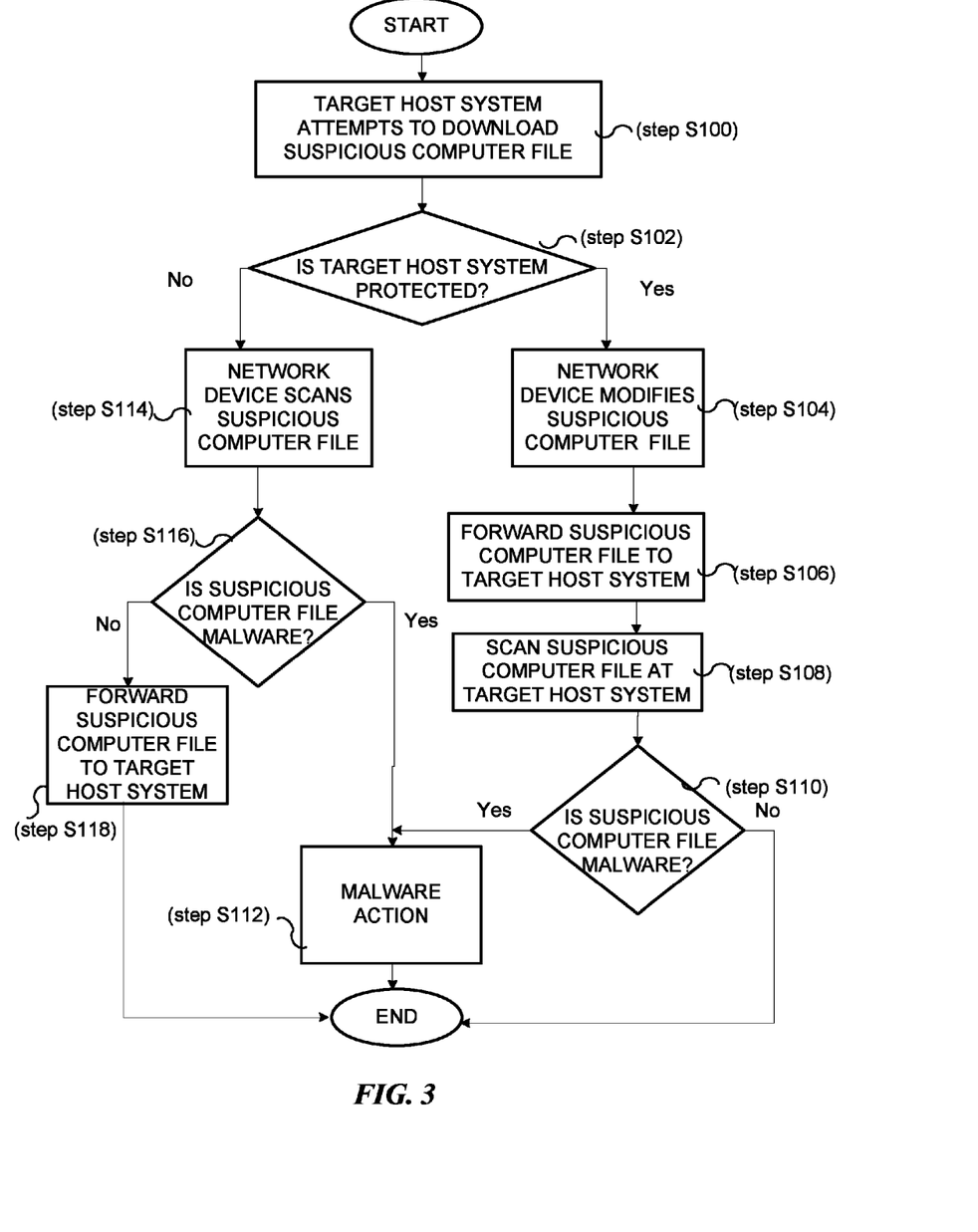
FIG. 3 is a flowchart of an exemplary process for ensuring scanning of files performed in accordance with the principles of the present invention.

FIG. 3 is a flowchart of an exemplary method performed in accordance with the principles of the present invention. The process flow may be implemented using an exemplary system, such as the exemplary system of FIG. 2. In accordance with one aspect, target computer 18 attempts to download a suspicious computer file (step S100). Determination function module 44 in network device 16 determines whether target computer 18 is protected by a participating agent (step S102). If target computer 18 is protected, network device 16 encrypts the suspicious computer file (step S104) using encryption function 42 and forwards the modified suspicious computer file to target computer 18 (step S106). As explained above, instead of encryption, encryption function 42 can modify the suspicious computer file to disable any malware within the suspicious computer file. Security software 36 in target computer 18 scans the suspicious computer file at target computer 18 (step S108). Security software 36 in target computer 18 determines whether the suspicious computer file is malware (step S110) and if so, target computer 18 performs a malware action as described above (step 112). If the suspicious computer file is not malware, target computer 18 may, for example, execute the suspicious computer file. If network device 16 determines that target computer 18 is not protected, security software 36 in network device 16 scans the suspicious computer file (step S114) and determines whether the suspicious computer file is malware (step S116). If the suspicious computer file is not malware, network device 16 forwards the suspicious computer file to target computer 18 as discussed above (step S118). If the suspicious computer file is malware, then the system performs a malware action (step S112), as described above.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product that comprises all the features enabling the implementation of the methods described herein, and which, when loaded in a computing system is able to carry out these methods. Storage medium refers to any volatile or non-volatile computer readable storage device such as magnetic storage, semiconductor memory, DVD, Compact Disk or memory stick.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

Program code may be transmitted to a computer constructed in accordance with the principles of the present invention using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. It is noted that the computer programs of the present invention can be downloaded via the Internet to a computer, such as network device 16 and/or target host system 18, having a TCP/IP-based network adapter card for installation in the computer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The term "computer-readable storage device" does not encompass a signal propagation media such as a copper cable, optical fiber or wireless transmission media.

It will be appreciated by persons skilled in the art that the present invention is not limited to what has been particularly shown and described herein above. A variety of modifications and variations are possible in light of the above teachings without departing from the scope and spirit of the invention, which is limited only by the following claims.

What is claimed is:

1. A method, comprising:
   a network device receiving a suspicious computer file addressed to and destined for a target computer, and in response;
   the network device determining whether a malware protection program is installed in the destined target computer; and
   in response to determining that the malwar protection program is installed in the destined target computer:
   the network device modifying, by at least encrypting, the suspicious computer file to make the suspicious computer file unusable by said target computer; and
   the network device sending the modified suspicious computer file to said target computer.

2. The method of claim 1, wherein if it is determined that the target computer is protected by the malware protection program, sending the computer file to the target computer without scanning the computer file with the network device.

3. The method of claim 1, wherein if it is determined that the target computer is protected by the malware protection program, scanning the modified suspicious computer file with the malware protection program at the target computer.

4. The method of claim 3, wherein scanning further comprises determining whether the suspicious computer file is malware.

5. The method of claim 4, wherein if the malware protection program determines that the suspicious computer file is not malware, returning the suspicious computer file to an original unmodified form and executing the suspicious computer file at the target computer.

6. The method of claim 4, wherein if the malware protection program determines that the suspicious computer file is malware, performing a malware action.

7. The method of claim 1, wherein if it is determined that the target computer is not protected by a malware protection program, scanning the suspicious computer file at the network device.

8. The method of claim 7, wherein scanning further comprises determining whether the suspicious computer file is malware.

9. The method of claim 8, wherein if it is determined that the suspicious computer file is malware, alerting the target computer that the suspicious computer file is malware.

10. The method of claim 8, wherein if it is determined that the suspicious computer file is not malware, sending the suspicious computer file to the target computer.

11. The method of claim 1, wherein modifying the suspicious computer file includes encrypting at least a portion of the suspicious computer file.

12. A system, comprising:
   a network device, the network device having:
   a central processing unit (CPU);
   a computer readable memory, the computer readable memory in communication with the CPU;
   a computer readable storage device, the computer readable storage device coupled to the computer readable memory;

first program instructions to receive a suspicious computer file at the network device addressed to and destined for a target computer;

second program instructions to determine at the network device whether the destined target computer is protected by a malware protection program, and if it is determined that said target computer is protected by the malware protection program, instruct the network device to modify, by at least encrypting, the suspicious computer file to make the suspicious computer file unusable by said target computer, and send the modified suspicious computer file to said target computer; and wherein the first and second program instructions are stored on the computer readable storage device for execution by the CPU via the computer readable memory.

13. The system of claim 12, wherein the computer system comprises third program instructions to instruct the target computer to scan the suspicious computer file if the network device determines that the target computer is protected by the malware protection program, wherein the third program instructions are stored on the computer readable storage media for execution by the CPU via the computer readable memory.

14. The system of claim 13, wherein the computer system comprises fourth program instructions to determine whether the suspicious computer file is malware, wherein the fourth program instructions are stored on the computer readable storage media for execution by the CPU via the computer readable memory.

15. The system of claim 14, wherein the target computer executes the suspicious computer file if it is determined that the suspicious computer file is not malware.

16. The system of claim 14, wherein the target computer performs a malware action if it is determined that the suspicious computer file is malware.

17. The system of claim 12, wherein the computer system comprises third program instructions to instruct the network device to scan the suspicious computer file if the network device determines that the target computer is not protected by the malware protection program, wherein the third program instructions are stored on the computer readable storage media for execution by the CPU via the computer readable memory.

18. The system of claim 17, wherein the computer system comprises fourth program instructions to instruct the network device to determine whether the suspicious computer file is malware, wherein the fourth program instructions are stored on the computer readable storage media for execution by the CPU via the computer readable memory.

19. The system of claim 18, wherein the computer system comprises fifth program instructions to alert the target computer that the suspicious computer file is malware if the network device determines that the suspicious computer file is malware, wherein the fifth program instructions are stored on the computer readable storage media for execution by the CPU via the computer readable memory.

20. The system of claim 18, wherein the computer system comprises fifth program instructions to send the suspicious computer file to the target computer if the network device determines that the suspicious computer file is not malware, wherein the fifth program instructions are stored on the computer readable storage media for execution by the CPU via the computer readable memory.

21. A computer program product for ensuring scanning of a suspicious computer file sent to a target computer, the computer program product comprising:

a computer readable storage device;

first program instructions to receive the suspicious computer file at a network device addressed to and destined for the target computer;

second program instructions to instruct the network device to determine whether the destined target computer is protected by a malware protection program, and if it is determined that said target computer is protected by the malware protection program, instruct the network device to modify, by at least encrypting, the suspicious computer file to make the suspicious computer file unusable by said target computer, and send the modified suspicious computer file to said target computer; and wherein the first and second program instructions are stored on the computer readable storage device.

22. The computer program product of claim 21, further comprising third program instructions to instruct the target computer to scan the suspicious computer file if the network device determines that the target computer is protected by the malware protection program, wherein the third program instructions are stored on the computer readable storage medium.

23. The computer program product of claim 22, further comprising fourth program instructions to determine whether the suspicious computer file is malware, wherein the fourth program instructions are stored on the computer readable storage medium.

24. The computer program product of claim 21, further comprising third program instructions to instruct the network device to scan the suspicious computer file if the network device determines that the target computer is not protected by the malware protection program, wherein the third program instructions are stored on the computer readable storage medium.

* * * * *